United States Patent [19]
Unterleitner et al.

[11] Patent Number: 5,226,104
[45] Date of Patent: Jul. 6, 1993

[54] OPTICAL FIBER COUPLER WITH ATTENUATOR

[75] Inventors: Fred C. Unterleitner, Palo Alto; Narinder S. Kapany, Woodside, both of Calif.

[73] Assignee: Kaptron, Inc., Palo Alto, Calif.

[21] Appl. No.: 736,269

[22] Filed: Jul. 24, 1991

[51] Int. Cl.$^5$ ............................................. G02B 6/26
[52] U.S. Cl. ..................................... 385/140; 385/18; 385/47
[58] Field of Search ............... 350/96.15, 96.16, 96.18, 350/96.20; 385/15, 18, 27, 31, 39, 46, 47, 52, 140

[56] References Cited

U.S. PATENT DOCUMENTS

| | | | |
|---|---|---|---|
| 4,329,017 | 5/1982 | Kapany et al. | 350/96.15 |
| 4,591,231 | 5/1986 | Kaiser et al. | 350/96.18 |
| 4,702,549 | 10/1987 | Duck et al. | 385/140 |
| 4,736,100 | 4/1988 | Vastagh | 350/96.20 X |
| 4,755,017 | 7/1988 | Kapany | 350/96.18 |
| 4,934,784 | 6/1990 | Kapany et al. | 350/96.18 |
| 4,989,938 | 2/1991 | Tamulevich | 385/140 X |
| 4,993,796 | 2/1991 | Kapany et al. | 350/96.15 |

FOREIGN PATENT DOCUMENTS

| | | | |
|---|---|---|---|
| 55-45062 | 3/1980 | Japan | 350/96.15 |
| 59-33404 | 2/1984 | Japan | 350/96.15 |

*Primary Examiner*—John D. Lee
*Attorney, Agent, or Firm*—Townsend and Townsend

[57] ABSTRACT

An attenuating centrosymmetric reflective (CSR) device is provided for controllably coupling optical energy between pairs of optical fibers. The CSR-based attenuating device comprises a CSR coupler having a neutral density attenuating plate inserted between a fiber holder portion of the device and the reflecting mirror. The attenuating plate is preferably of variable density so that translation of the attenuating plate across the path of the beams results in varying attenuation. In a specific embodiment, back reflections to the source are eliminated by positioning the variable density attenuator plate at an angle large enough so that reflections of all reflected rays exceed the acceptance angle of the fiber ends. The variable density attenuating plate may be manually or automatically moved to obtain the desired attenuation.

5 Claims, 1 Drawing Sheet

OPTICAL FIBER COUPLER WITH ATTENUATOR

BACKGROUND OF THE INVENTION

This invention relates to optical fiber couplers with attenuation, particularly variable attenuation and more particularly to a centrosymmetric spherical reflector-type optical fiber coupler.

Centrosymmetric reflective (CSR) technology employs concave mirrors to couple the output of one of one or more optical fibers into one or more other optical fibers. A CSR device uses a concave sphere-segment reflective surface such that an object placed in a plane perpendicular to the symmetry axis of the spherical segment and containing the center of curvature images the object on the opposite side of the axis equidistant from the center of curvature. The imagery is completely achromatic, mode insensitive and diffraction limited so long as the object and image are not too far from the axis of the reflector. Representative CSR devices are disclosed for example in U.S. Pat. Nos. 4,934,784 issued Jun. 19, 1990 and 4,329,017 issued May 11, 1982 in the name of Kaptron, Inc. of Palo Alto, Calif.

It is useful to control the coupling between pairs of optical fibers in a CSR device. What is needed is a mechanism for controlling the coupling without affecting the mode distribution in the fibers.

SUMMARY OF THE INVENTION

According to the invention, an attenuating centrosymmetric reflective (CSR) device is provided for controllably coupling optical energy between pairs of optical fibers. The CSR-based attenuating device comprises a CSR coupler having a neutral density attenuating plate inserted between a fiber holder portion of the device and the reflecting mirror. The attenuating plate is preferably of variable density so that translation of the attenuating plate across the path of the beams results in varying attenuation. In a specific embodiment, back reflections to the source are eliminated by positioning the variable density attenuator plate at an angle large enough so that reflections of all reflected rays exceed the acceptance angle of the fiber ends. The variable density attenuating plate may be manually or automatically moved to obtain the desired attenuation. Attenuations of up to 60 dB can be achieved using a neutral density filter technology having single pass attenuation of one-half the desired attenuation, since attenuation occurs upon the passage of rays twice through the plate. In an alternative embodiment the neutral density plate is a liquid crystal device or other electro-optic device whose density or polarization can be controlled electronically by application of a voltage. Either the motorized or the electronically-controlled-type attenuation system can be employed in connection with a monitor and feedback control to maintain a desired constant level of signal.

The invention will be better understood by reference to the following detailed description in connection with the accompanying drawings.

DESCRIPTION OF THE PREFERRED EMBODIMENT

Figure 1:
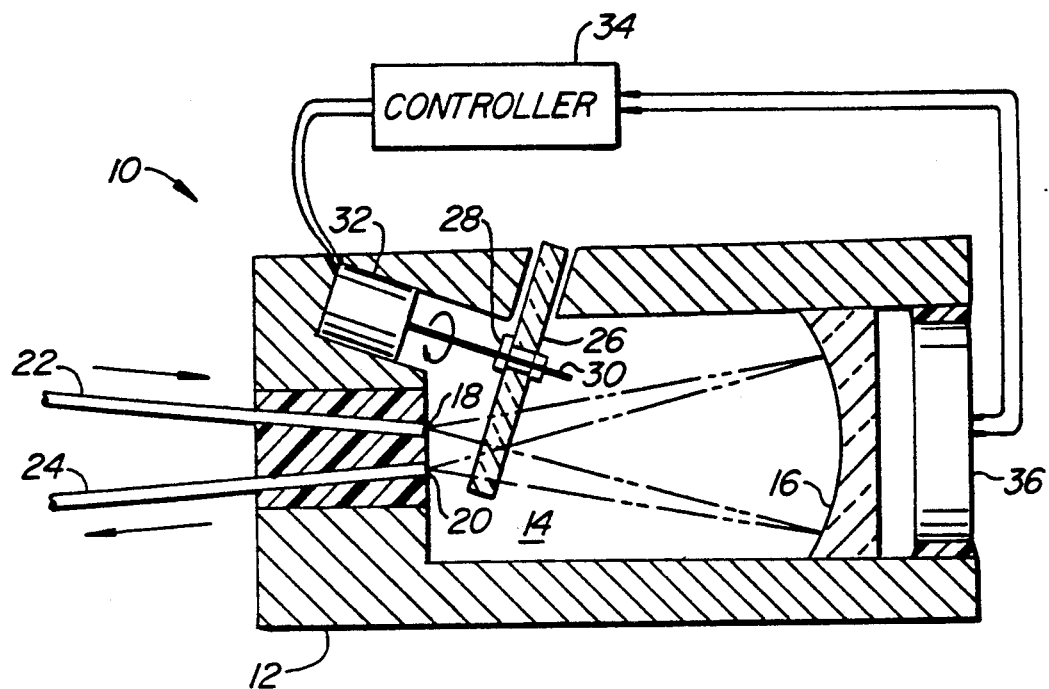
FIG. 1 is a side cross-sectional view and schematic of a first embodiment of the invention.

FIG. 1 shows a cross-sectional of a typical embodiment of the centrosymmetric reflective (CSR) attenuator 10 in accordance with the invention. The CSR attenuator 10 comprises a housing 12 forming a centrosymmetric reflector 14 (which may be either a cavity or a monolithic reflective structure forming a concave reflector 16 at one end and fiber optic ends 18 and 20 at the other end. Fiber optic cables 22 and 24 extend from fiber optic ends 18 and 20, respectively for admission and extraction of optical energy. According to the invention, a neutral density plate 26 is provided which is disposed to block passage of optical energy between the fiber optic ends 18 and 20 and the concave reflector 16 (Surfaces exposed to changes in index of refraction are preferably provided with anti-reflective coatings.) The neutral density plate 26 may be a fixed, constant density neutral density filter or preferably, in a variable attenuation configuration, a circular linear-wedge neutral density filter of the type distributed by Melles Griot. It has a varying density with angular displacement and a hollow center for a hub 28 for mounting to a spindle 30. The spindle 30 may be mounted to a base and a portion of the filter disk may be externally accessible for manual displacement to a desired angular position. The spindle 30 is preferably coupled to a motor 32 in a motorized embodiment, which is under control of a controller 34. Control may be open loop or closed loop, for example, in response to a feedback signal from an optical sensor 36 mounted to receive residual optical energy behind the concave reflector 16.

In operation, the controller 34 drives the motor 32 to turn the spindle 30 whereby the neutral density plate is turned to set the attenuation of optical energy passing therethrough. The plate 26 is disposed at an angle so that reflections of optical energy do not impinge upon the fiber ends 18 or 20.

The plate 26 is typically coated with an attenuating film which consists of nickel alloys. Nickel alloys are known for their flat spectral absorbance. However, for limited wavelength ranges, dielectric, multilayer interference coatings can be used.

Figure 2:
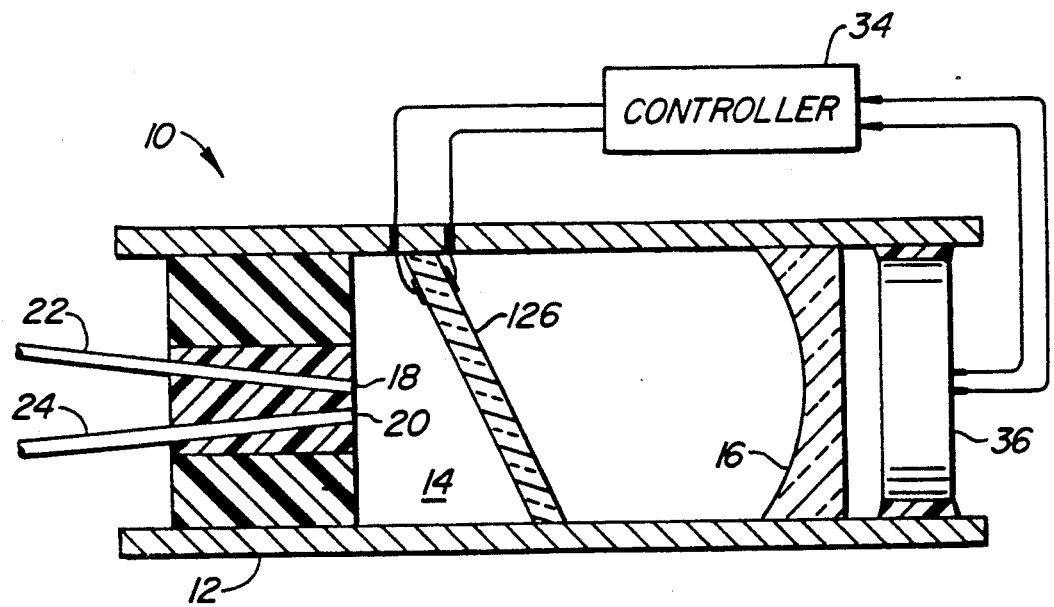
FIG. 2 is a side cross-sectional view and schematic of a second embodiment of the invention.

Referring to FIG. 2, there is shown an alternative embodiment of the invention employing much the same basic structure as that of FIG. 1. However, there is provided an electronically variable density neutral density plate means 126 which is fixedly mounted between the first and second optical ends 18 and 20 and the concave reflector, the neutral density plate means 126 being responsive to a voltage to vary the density and thus vary the attenuation of optical energy transmitted through the plate means 126. An appropriate neutral density plate is a liquid crystal device or electro-optic glass device operating in the linear operation region between fully on and fully off. Alternatively, the CSR structure could be monolithic with the plate means 126 embedded in between the reflective surface 16 and the fiber ends 18 and 18. The sensor 36 senses the level of optical energy impinging on the reflective surface 16 and provides a sense signal to the controller 34. The controller 34 in turn controls the electrical signal applied to the neutral density plate means 126 through an appropriate negative feedback control loop.

The invention has now been explained with reference to specific embodiments. Other embodiments will be apparent to those of ordinary skill in the art. It is therefore not intended that this invention be limited except as indicated by the appended claims.

What is claimed is:

1. A fiber optic centrosymmetric reflective attenuation apparatus comprising:

a concave reflective surface disposed in a centrosymmetric reflective structure;

first and second optical fiber ends for terminating optical fibers and admitting optical energy to said centrosymmetric reflective structure, said first and second optical fiber ends being disposed for transmitting optical energy from said first fiber end to said second fiber end by reflection upon said concave reflective surface; and neutral density plate means disposed between said first and second optical fiber ends and said concave reflective surface for attenuating optical energy passing between said first fiber end and said second fiber end wherein said plate means comprises an electronically-controllable variable density neutral density plate fixedly mounted between said first and second optical fiber ends and said reflective surface, said neutral density plate being responsive to application of an electric control signal to vary attenuation of optical energy, and means for applying a control signal to said variable density plate in order to vary attenuation of optical energy directed from said first fiber end to said second fiber end.

2. The attenuation apparatus according to claim 1 wherein said plate means is disposed at an angle sufficient to prevent back reflections into said first and second optical fiber ends.

3. The attenuation apparatus according to claim 2 wherein said plate means comprises a variable density neutral density plate and means for displacing said neutral density plate in order to vary attenuation of optical energy directed from said first fiber end to said second fiber end.

4. The attenuation apparatus according to claim 1 further including:

optical sensing means for sensing transmission of optical energy to said reflective surface; and means coupled to said optical sensing means for controlling said control signal applying means to control attenuation of said variable neutral density plate.

5. The attenuation apparatus according to claim 1 wherein the neutral density plate is a liquid crystal device.

* * * * *